(12) United States Patent
van de Beek et al.

(10) Patent No.: US 8,654,872 B2
(45) Date of Patent: Feb. 18, 2014

(54) METHOD, APPARATUS AND PRODUCT OF OFDM TRANSMISSION

(75) Inventors: Jaap van de Beek, Täby (SE); Fredrik Berggren, Upplands Väsby (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 483 days.

(21) Appl. No.: 13/021,471

(22) Filed: Feb. 4, 2011

(65) Prior Publication Data

US 2011/0129031 A1 Jun. 2, 2011

Related U.S. Application Data

(63) Continuation of application No. PCT/CN2008/071869, filed on Aug. 5, 2008.

(51) Int. Cl.
*H04L 27/00* (2006.01)

(52) U.S. Cl.
USPC .......................................................... 375/260

(58) Field of Classification Search
CPC ............ H04L 27/2601; H04L 27/2614; H04L 27/2628; H04L 27/2649; H04L 27/2626
USPC .......... 375/260, 295, 316; 370/343, 203, 208, 370/210
See application file for complete search history.

(56) References Cited

U.S. PATENT DOCUMENTS

| | | | |
|---|---|---|---|
| 6,925,128 B2 * | 8/2005 | Corral | 375/260 |
| 8,184,728 B1 * | 5/2012 | Mahmoud et al. | 375/260 |
| 2003/0125040 A1 * | 7/2003 | Walton et al. | 455/454 |
| 2005/0058212 A1 | 3/2005 | Shao | |
| 2005/0111656 A1 | 5/2005 | Jin | |
| 2006/0008017 A1 | 1/2006 | Balakrishnan et al. | |
| 2006/0077885 A1 | 4/2006 | Schnell et al. | |
| 2006/0222097 A1 * | 10/2006 | Gupta et al. | 375/260 |
| 2007/0195898 A1 | 8/2007 | Yamaguchi | |
| 2008/0002779 A1 * | 1/2008 | Carsello | 375/260 |
| 2009/0003478 A1 * | 1/2009 | Kim et al. | 375/260 |
| 2011/0019528 A1 * | 1/2011 | Van De Beek et al. | 370/206 |
| 2012/0269286 A1 * | 10/2012 | Huang et al. | 375/295 |

FOREIGN PATENT DOCUMENTS

| | | |
|---|---|---|
| CN | 101127532 A | 2/2008 |
| WO | WO 2009/117874 A1 | 10/2009 |

OTHER PUBLICATIONS

Hisham A.Mahmoud and Huseyin Arslan, "Sidelobe Suppression in OFDM-Based Spectrum Sharing Systems Using Adaptive Symbol Transition", University of South Florida, Feb. 2008.*

Guanghui He and Zucheng Zhou, A Novel Approach for MIMO Adaptive Equalization Based on Affine Projection Algorithm, Tsinghua University, Oct. 2006, IEEE.*

Office Action issued in corresponding Chinese Patent Application No. 200880129996.9, mailed Jul. 3, 2012.

Jayalath et al., "Reducing the Out of Band Radiation of OFDM Using an Extended Guard Interval" IEEE 2001.

(Continued)

*Primary Examiner* — Aristocratis Fotoakis

(74) *Attorney, Agent, or Firm* — Brinks Gilson & Lione

(57) ABSTRACT

Methods for transmission and detection, as well as a transmitter and a receiver for performing the methods are disclosed. An example transmission method according to an aspect of the invention includes determining of a modulation vector for an information symbol vector and modulating subcarriers with elements of the modulation vector. Example resulting out-of-band signal power emission improvements over prior art are demonstrated.

20 Claims, 5 Drawing Sheets

(56) References Cited

OTHER PUBLICATIONS

Extended European Search Report issued in corresponding European Patent Application No. 08783862.9, mailed Sep. 8, 2011.
International Search Report and Written Opinion of the International Searching Authority issued in corresponding PCT Patent Application No. PCT/CN2008/071869, mailed Apr. 30, 2009.
Batra et al., "Multi-band OFDM: A Cognitive Radio for UWB" IEEE ISCAS 2006.
Brandes et al., "Reduction of Out-of-Band Radiation in OFDM Systems by Insertion of Cancellation Carriers" IEEE Communications Letters, vol. 10, No. 6, Jun. 2006.
Chan et al., "Solving Quadratically Constrained Least Squares Using Black Box Solvers" BIT vol. 32, 1992.
Chung, "Spectrally Precoded OFDM" IEEE Transactions on Communications, vol. 54, No. 12, Dec. 2006.
Chung, "Spectrally Precoded OFDM with Cyclic Prefix" ICC IEEE 2007.
Cosovic et al., "Subcarrier Weighting: A Method for Sidelobe Suppression in OFDM Systems" IEEE Communications Letters, vol. 10, No. 6, Jun. 2006.
Pauli et al., "On the Reduction of the Out-of-Band Radiation of OFDM-Signals" IEEE 1998.
Yamaguchi, "Active Interference Cancellation Technique for MB-OFDM Cognitive Radio" $34^{TH}$ European Microwave Conference—Amsterdam, 2004.
$3^{rd}$ Generation Partnership Project, "Technical Specification Group Radio Access Network; Evolved Universal Terrestrial Radio Access (E-UTRA); Base Station (BS) Radio Transmission and Reception" Release 8, 3GPP TS 36.104. v8.0.0, Dec. 2007.
$3^{rd}$ Generation Partnership Project, "Technical Specification Group Radio Access Network; Feasibility Study for Orthogonal Frequency Division Multiplexing (OFDM) for UTRAN Enhancement" Release 6, 3GPP TR 25.892. V6.0.0, Jun. 2004.

\* cited by examiner

METHOD, APPARATUS AND PRODUCT OF OFDM TRANSMISSION

RELATED APPLICATIONS

This patent application is a continuation of International Application No. PCT/CN2008/71869 filed on Aug. 5, 2008, incorporated herein by reference.

TECHNICAL FIELD

The present invention relates to transmission and detection of a signal comprising subcarriers. In particular, it pertains to a field of technology of limiting transmission signal power outside a designated transmission bandwidth for such signals.

BACKGROUND

Orthogonal Frequency Division Multiplexing, OFDM, has been selected in many communication systems, e.g. in $3^{rd}$ Generation Partnership Project Evolved UMTS Terrestrial Radio Access, 3GPP E-UTRA, and Digital Subscriber Line, DSL, systems, such as Asymmetric Digital Subscriber Line, ADSL, systems. Also, OFDM is used for ordinary broadcasting systems, such as Digital Audio Broadcasting, DAB, and Digital Video Broadcasting, DVB, systems. Thus, OFDM is used for both wireless and wireline systems carrying data on a large number of subcarriers. These systems can facilitate high spectral efficiency, since OFDM is suitable for, for example, combination with Multiple Input Multiple Output processing (MIMO-processing) and/or opportunistic transmission schemes.

However, the spectral efficiency of the systems, for both wireless and wireline systems, also depends on the level of the out-of-band power emission, i.e. the power level of the OFDM signal being emitted outside a designated transmission bandwidth. If the out-of-band power is efficiently suppressed, adjacent frequency channels can be spaced densely, and thereby spectrum utilization is improved in the system. Also, the out-of-band emissions must be kept below certain levels in order not to cause significant interference in adjacent frequency bands.

For these reasons, in many system standards, the out-of-band power emissions are regulated and restricted. Several types of requirements exist to regulate the out-of-band power emissions of a signal. In E-UTRA for example, spectral masks, adjacent-channel-leakage-ratios and occupied bandwidth requirements have been defined.

An OFDM signal (being a multiplex of a large number of finite-length complex-valued exponential waveforms) has a power spectrum determined by a number of squared-sin c-shaped functions, where $\sin c(x)=\sin(x)/x$. Typically, due to the finite-duration of the exponentials, OFDM signals will not meet requirements on out-of-band emission in a standard, since the spectrum side lobes decay slowly. This slow decay causes the OFDM power spectrum to become relatively broad, resulting in problematic out-of-band emissions, which have to be reduced in some way.

The power spectrum of an OFDM signal is determined by two quantities; a pulse shape and a correlation between the transmitted symbols. When all data symbols in the OFDM signal are uncorrelated, the slow decay of the OFDM spectrum is caused by the finite-duration property of the pulse shape for the individual OFDM symbols constituting the OFDM signal.

In the prior art, two categories of methods for reducing out-of-band emission have been developed, where each of these two categories deals with either the pulse shape or the correlation between the transmitted symbols.

In prior art, time-windowing of the OFDM signal has been proposed in order to tie consecutive OFDM symbols together. This method belongs to the first category mentioned above, i.e. it changes the pulse shape, and uses a prolonged cyclic prefix and an additional postfix. A time-windowed postfix of a previous symbol overlaps with a time-windowed cyclic prefix of a current symbol. However, due to the use of a longer cyclic prefix used by the method, the symbol rate and/or spectral efficiency of the system decrease when the method is implemented. Alternatively, instead of prolonging the cyclic prefix, the overlap could be extended into the cyclic prefix of a succeeding OFDM symbol. However, this would cause intersymbol interference, and would hence reduce an effective length of the cyclic prefix, which would result in a higher sensitivity to channel dispersion.

Also, time-windowing could be performed without overlapping the two consecutive OFDM symbols. This variant can be regarded as a ramping in the front and end of the OFDM symbol, forcing its beginning and end to zero. However, the ramping method results in a shorter effective cyclic prefix, and thus also in a higher sensitivity to channel dispersion.

Further, lowpass transmit filtering of the OFDM signal, in order to shape the power spectrum, which is used in some prior art solutions, also results in intersymbol interference and a reduced effective length of the cyclic prefix, and hence also in higher sensitivity to channel dispersion.

Moreover, in some prior art solutions belonging to the second category mentioned above, i.e. introducing correlation between transmitted data symbols, data subcarriers are pre-processed prior to the IFFT. According to one method, data symbols are weighted with real-valued numbers. These weights are chosen to reduce the out-of-band emissions caused by the rectangular pulse shape. Due to this weighting, the Bit Error Rate, BER, will increase the more the out-of-band emission is suppressed.

Further, in other prior art solutions belonging to the second category mentioned above, i.e. introducing correlation between transmitted data symbols, cognitive multi-band OFDM systems have been considered where the problem is to achieve low interference in certain parts of the frequency band. Methods have been proposed, whose purpose is to create frequency notches within the OFDM frequency band, in which other systems could transmit.

These solutions achieve a form of an in-band power emission reduction, where the interference in a so called victim-band should be minimized. The unwanted power in the victim-band is due to the finite duration of the OFDM symbols, which translates to an unlimited width of the frequency spectrum, such that the frequency spectrum for OFDM only is zero at the subcarrier frequencies. Hence, there will be undesired in-band power at frequencies located between subcarriers.

Prior art methods compute the interference contribution of the data symbols to the victim-band at target frequencies located between the subcarrier tones of the system. Instead of creating a guard band by nulling subcarriers next to the victim band, these subcarriers, and possibly also subcarriers within the victim-band, are modulated so as to minimize the power in the victim-band. This concept has been referred to as Active Interference Cancellation, AIC. The AIC can be posed as a least-squares problem defined in the frequency domain, where the solution is the modulation symbols that should be used on the reserved AIC subcarriers in order to cancel as much as possible of the interference power within the victim-band.

Further, in other prior art solutions belonging to the second category mentioned above, i.e. introducing correlation between transmitted data symbols within one OFDM symbol, the usage of modulated cancellation subcarriers for out-of-band emission has been described. The general idea of these solutions was the same as for the AIC concept, but here the victim band was a side-band (and not an in-band as in AIC). However, the performance of these methods is poor.

The methods belonging to the second category described above modulate cancellation subcarriers in order to reduce unwanted emission, and include design parameters that must be specified, for example the target frequencies that should be suppressed. Further, the principle of these methods is to try to compensate for unwanted out-of-band, or in-band emissions, at certain target frequencies, which in the methods have already been accepted as being present. Thus, these prior art methods do not try to directly correct the fundamental cause of the unwanted emissions, i.e. the finite duration of the OFDM symbol. Instead, they try to reduce the negative effects resulting from these emissions.

Thus, the prior art presents inefficient solutions having drawbacks regarding symbol rate, spectral efficiency and interference.

SUMMARY

An example embodiment of the invention provides a method for transmission of an OFDM signal being composed of OFDM symbols transmitted by a set of OFDM subcarriers comprising, defining an association of each element of a current information symbol vector, $d_i$, with a subcarrier of said set of frequency subcarriers, determining a current modulation vector, $\bar{d}_i$, corresponding to addition of a transmitter correction vector, $w_i$, to said current information symbol vector, $d_i$, providing a transition between a previous symbol and said current symbol to have continuity of a specified order, n, in time domain, and modulating said set of frequency subcarriers with elements of said current modulation vector, $\bar{d}_i$, in accordance with said association.

A further example embodiment of the invention provides, for recursive detection comprising for an iteration stage j, performing demodulation of said set of frequency subcarriers, where said set of frequency subcarriers carries a signal having continuity of a specified order, n, in time domain for transitions between the symbols, said demodulation resulting in a received modulation vector $r_i$, determining a decision vector $\bar{r}_i^{(j)}$ corresponding to addition of a receiver correction vector $v_i^{(j)}$ to said received modulation vector $r_i$, and determining a detected information symbol vector $\hat{d}_i^{(j)}$, containing symbol data, from said decision vector $\bar{r}_i^{(j)}$.

A preferred embodiment of the invention comprises transmission, on the used set of OFDM subcarriers, a modulation vector, $\bar{d}_i$, instead of transmitting an information symbol vector, $d_i$, directly. According to the embodiment, the information symbol vector, $d_i$, is preferably altered by adding a correction vector $w_i$ to it, whereby a modulation vector $\bar{d}_i$ is created, which is used for the modulation. The correction vector $w_i$ for the modulation vector $\bar{d}_i$ is determined rendering a transition between sequential OFDM symbols in the OFDM signal to have a continuity of a specified order in time domain. Thereby, discontinuities usually appearing between symbols in an OFDM signal are alleviated and a smooth OFDM signal is provided.

Preferred embodiments of the invention thereby mitigate out-of-band transmission by at least partially eliminating the very cause of the out-of-band emission, caused by time-domain discontinuities in the OFDM signal. This contrasts with prior art solutions accepting the discontinuities as being present and then undertaking different actions for trying to mitigate the out-of-band transmission power.

Further, example embodiments of the invention removes the cause of the out-of-band transmission without the use of additional transmit power and with no or very small increase in error rates.

Also, example realizations in accordance with the invention are easily implemented without requiring prior art modification of the length of the cyclic prefix or determination of target frequencies to suppress.

In brief, preferred embodiments of the invention offer efficient reduction of out-of-band emission.

According to a preferred embodiment of the invention, the continuity is based on a set of equations:

$$\left.\frac{d^n}{dt^n}s_i(t)\right|_{t=-T_g} = \left.\frac{d^n}{dt^n}s_{i-1}(t)\right|_{t=T_s}\quad n\in I_N,$$

where $-I_N$ is an index set of non-negative integers, $-s_i(t)$ is an ith OFDM symbol in said OFDM signal, being defined for a time period between a first time instant $-T_g$ and a second time instant $T_s$, i being an integer.

Detailed example embodiments and advantages of the low out-of-band emission transmission according to the invention will now be described with reference to the appended drawings.

DETAILED DESCRIPTION

Figure 1:
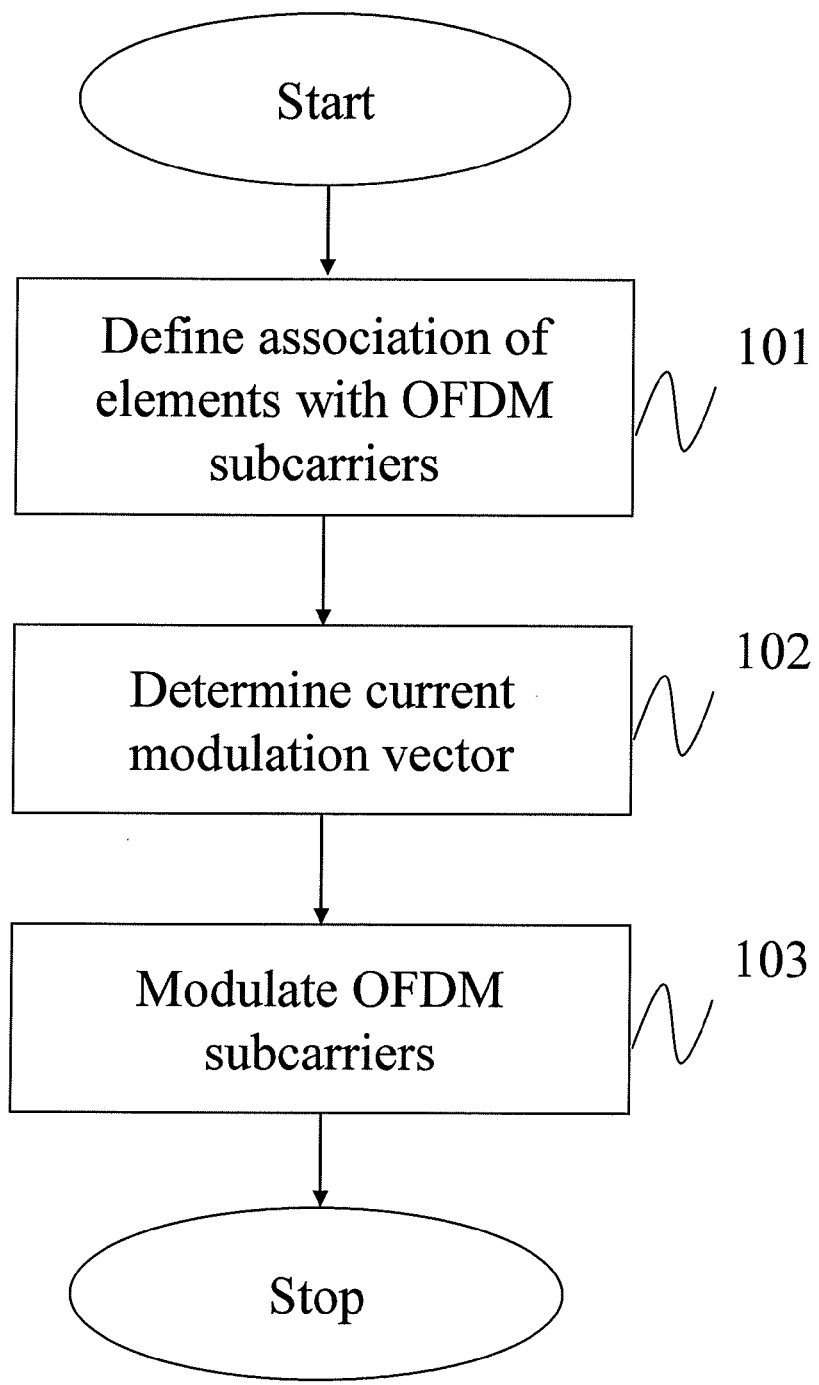
FIG. 1 shows a flowchart of a preferred method of transmission in accordance with the invention.

One reason for poor performance in prior art is that prior art methods operate on a symbol-by-symbol basis and do not exploit the fact that previously transmitted OFDM symbols are known by the transmitter at any time.

The finite-duration of uncoordinated time-subsequent symbols causes instantaneous changes in the phase and amplitude of the signal at the edges of the OFDM symbols. In other words, out-of-band power emanates from the signal transitions between different OFDM symbols.

Also, the prior art solutions try to reduce the effects of the unwanted out-of-band emissions, rather than to correct the cause of the unwanted emissions itself.

Example embodiments of the invention demonstrate a reduction of transmitted signal power outside of a designated transmission bandwidth at improved efficiency as compared to prior art.

A classical OFDM signal g(t) is a sequence of OFDM symbols:

$$g(t) = \sum_i s_i(t - iT), \quad (\text{eq. 1})$$

where $T=T_s+T_g$. $T_s$ is the useful symbol time and $T_g$ is the guard interval for the OFDM symbol.

The invention solves the problem of discontinuity in OFDM signals, i.e. the disadvantageous property of classical OFDM signals that discontinuous transitions occur at the time instants between consecutive OFDM symbols. According to the invention, these discontinuities are removed.

A preferred solution, in accordance with the invention, of this problem is based on transmitting a modulation vector $\overline{d}_i$, on the used set of OFDM subcarriers instead of, as is done in prior art solutions, directly transmitting an information symbol vector $d_i$ on the OFDM subcarriers. (Throughout this document, vector notation is used, where each element of, for example, the information symbol vector $d_i$ and the modulation vector $\overline{d}_i$ is associated with an OFDM subcarrier. Vectors are denoted in bold font in this document.) Thus, the information symbol vector $d_i$, containing data for an OFDM symbol is, according to the invention, modified in order to result in the modulation vector $\overline{d}_i$. This modification of the information symbol vector $d_i$ can be seen as a precoding of the information symbol vector $d_i$ into the modulation vector $\overline{d}_i$. The modification can also be seen as a mapping of the (complex-valued) information symbol vector $d_i$ onto the (complex-valued) modulation vector $\overline{d}_i$.

Thus, according to the invention, the ith transmitted OFDM symbol in the sequence of equation 1, including a cyclic prefix, is modeled as:

$$s_i(t) = \begin{cases} \sum_{k \in I_D} \overline{d}_{k,i} e^{j2\pi \frac{k}{T_s} t} & -T_g \leq t < T_s \\ 0 & \text{elsewhere,} \end{cases} \quad (\text{eq. 2})$$

Where $\overline{d}_i$ is the modulation vector containing the elements $\overline{d}_{k,i}$, and $I_D=\{k_0, k_1, k_2, \ldots, k_{K-1}\}$ denotes the index set of subcarriers.

Hereafter, the determination of the modulation vector $\overline{d}_i$, in the transmitter, according to the invention, is described. In this document, the term "current", being used for OFDM symbols in the OFDM signal, refers to one OFDM symbol in the OFDM signal in the time domain. Correspondingly, the term "previous", being used for OFDM symbols, refers to one OFDM symbol, which in the time domain precedes the one OFDM symbol being the current OFDM symbol. Thus, a current OFDM symbol follows the previous OFDM symbol in the sequence of OFDM symbols constituting the OFDM signal g(t) in equation 1.

FIG. 1 shows a flowchart for a preferred method of transmission in accordance with the invention. In a first step 101, an association is defined, in which each element of an information symbol vector $d_i$ for a current OFDM symbol is associated with a certain OFDM subcarrier. Specifically, the kth element of the information symbol vector $d_i$ for a current symbol is associated with a kth OFDM subcarrier of the set of OFDM subcarriers to be used for transmitting the OFDM signal, where k is such that all elements of the information symbol vector $d_i$ are associated with a separate OFDM subcarrier. Thus, by this step, an association is defined for the elements of the information symbol vector $d_i$ with the OFDM subcarriers as if the information symbol vector $d_i$ was to be transmitted. However, as will be shown below, this defined association will be used for associating the elements of the modulation vector $\overline{d}_i$, being determined by the method, with the OFDM subcarriers, rather than the elements of the information symbol vector $d_i$.

Then, the modulation vector $\overline{d}_i$ for the current OFDM symbol must be determined. This determination is performed in a second step 102 by, for the current OFDM symbol, adding a transmitter correction vector $w_i$ to the information symbol vector $d_i$:

$$\overline{d}_i = d_i + w_i. \quad (\text{eq. 3})$$

This addition should be performed such that a smooth transition between the previous and the current OFDM symbol in the OFDM signal is achieved. Thus, the transition between the previous and the current OFDM symbol should have a continuity in the time domain.

In order to achieve this smooth transition, the transmitter correction vector $w_i$ to be added to the information symbol vector $d_i$, which results in this smooth transition, has to be determined. According to an embodiment of the invention, the transmitter correction vector $w_i$ is sought as being a function of the information symbol vector d for the current OFDM symbol and of the modulation vector $\overline{d}_{i-1}$ for a previous OFDM symbol.

According to an embodiment of the invention, a smooth transition between the previous and the current OFDM symbol is defined by the following set of equations:

$$\frac{d^n}{dt^n} s_i(t) \bigg|_{t=-T_g} = \frac{d^n}{dt^n} s_{i-1}(t) \bigg|_{t=T_s} \quad n \in I_N, \quad (\text{eq. 4})$$

where $I_N$ is an index set containing non-negative integers. The equalities in this set of equations mathematically formulate a requirement of continuity of the OFDM signal, n=0, and its derivatives, n≥1, at the boundaries for the OFDM symbol defined in equation 2. Here $I_N$ is the index set of derivation orders. In a non-limiting example, $I_N=\{0, 1, 2, \ldots, N-1\}$. The criterion in equation 4 provides for a steep out-of-band spectral roll-off.

The criteria, considering the various elements n of $I_N$, for achieving the smooth transitions between the OFDM symbols of the OFDM signal brings the advantage that it guarantees a steep out-of-band spectral roll-off for the OFDM signal. This is possible since the order of the derivatives in the expression can be chosen such that a suitable order of continuity is achieved.

For determining one or more derivatives in the time-point $t=T_s$, $s_i(t)$ or the time-interval for which it applies is conceptually/imaginary continued into the next OFDM symbol's interval to comply with existence and continuity requirements of functions capable of having a derivative for a particular point in time.

Further, according to an embodiment of the invention, the modulation vector $\overline{d}_i$ should also be "nearest" to the information symbol vector $d_i$ in a Euclidean sense. Thus, the transmitter correction vector $w_i$ should be chosen such that the Euclidian distance between the modulation vector $\overline{d}_i$ and the information symbol vector $d_i$ is as small as possible.

Thus, according to this embodiment of the invention, a transmitter correction vector $w_i$ is determined, as function of the information symbol vector $d_i$ for the current OFDM symbol and of the modulation vector $\overline{d}_{i-1}$ for a previous OFDM symbol, which satisfies the set of equations in equation 4 and results in a modulation vector $\bar{d}_i$ having the smallest possible Euclidean distance to the information symbol vector $d_i$.

By using equation 3, the continuity criteria in equation 4 may be rewritten in matrix form in order to find a solution which is nearest to the information symbol vector, $d_i$ as follows. First, equation 3 is substituted in equation 4, and the derivations are explicitly performed, thereby obtaining a set of N linear equations in the K weights $w_{k,i}$:

$$\sum_{k \in I_C} (w_{k,i} + d_{k,i}) e^{-j2\pi f_k T_g} f_k^n = \sum_{k \in I_C} \bar{d}_{k,i-1} f_k^n, \quad (eq. 5)$$

$$n = 0, 1, 2, \ldots, N-1.$$

Second, equation 5 is rewritten in matrix form. An N×K matrix A, is defined having elements of a form corresponding to $k^m$, and a K×K matrix $\Phi$ is defined being a diagonal matrix having elements of a form corresponding to $e^{j\alpha k}$. Here, k is an OFDM subcarrier index, m is an integer, and $\alpha$ is an arbitrary value.

According to an embodiment of the invention, the matrix A is defined as:

$$A = \begin{pmatrix} 1 & 1 & \ldots & 1 \\ k_0 & k_1 & \ldots & k_{K-1} \\ \vdots & \vdots & & \vdots \\ k_0^{N-1} & k_1^{N-1} & \ldots & k_{K-1}^{N-1} \end{pmatrix}. \quad (eq. 6)$$

According to an embodiment of the invention, the matrix $\Phi$ is defined as:

$$\Phi = \text{diag}\begin{pmatrix} e^{-j2\pi k_0 \frac{T_g}{T_s}} \\ e^{-j2\pi k_1 \frac{T_g}{T_s}} \\ \vdots \\ e^{-j2\pi k_{K-1} \frac{T_g}{T_s}} \end{pmatrix}. \quad (eq. 7)$$

(Note: $f_k = k/T_s$ in Equations 6 and 7.)
Further, the equation 5 is rewritten as:

$$A\Phi d_i + A\Phi w_i = A\bar{d}_{i-1}. \quad (eq. 8)$$

Usually, N<<K. Therefore, there are many solutions to the set of equations in (eq. 5). According to an embodiment of the invention, equation 8 is solved for the transmitter correction vector $w_i$ by using the Moore-Penrose pseudo-inverse of $A\Phi$. The use of the Moore-Penrose pseudo-inverse guarantees that the solution transmitter correction vector $w_i$ is the solution being nearest to the information symbol vector $d_i$ in a Euclidean sense, while still satisfying the smoothness criteria of equation 4.

The solution to equation 8 is:

$$w_i = -\Phi^H A^H (AA^H)^{-1} A\Phi (d_i - \Phi^H \bar{d}_{i-1}) \quad (eq. 9)$$
$$= -P(d_i - \Phi^H \bar{d}_{i-1}),$$

where the following notation has been used for brevity:

$$P = \Phi^H A^H (AA^H)^{-1} A\Phi. \quad (eq. 10)$$

In this document, $(\cdot)^H$ denotes a Hermitian transpose. By substitution of this result into equation 3, the modulation vector $\bar{d}_i$ is finally obtained as:

$$\bar{d}_i = (I - P) d_i + P\Phi^H \bar{d}_{i-1}. \quad (eq. 11)$$

This solution, resulting in the modulation vector $\bar{d}_i$, thus gives a rule for determining the modulation vector $\bar{d}_i$ from the information symbol vector $d_i$. That is, the transmitter correction vector $w_i$ is found, which is used for mapping/precoding the information symbol vector $d_i$ to the modulation vector $\bar{d}_i$.

As can be seen in equation 9, the transmitter correction vector $w_i$ is a function of the information symbol vector $d_i$ for a current OFDM symbol and of the modulation vector $\bar{d}_{i-1}$ for a previous OFDM symbol.

According to an embodiment of the invention, for a more general index set of derivation orders $I_N$, a more general representation of the transmitter correction vector $w_i$ is equal to:

$$w_i = -Pd_i + Q\bar{d}_{i-1}, \quad (eq. 12)$$

such that the current modulation vector $\bar{d}_i$ is equal to:

$$\bar{d}_i = (I - P) d_i + Q\bar{d}_{i-1}, \quad (eq. 13)$$

where P and Q are functions of A and $\Phi$.

According to the embodiment or the invention described in equation 11 above, P and Q in equation 13 are $P = \Phi^H A^H (AA^H)^{-1} A\Phi$ and $Q = P\Phi^H$, which gives the equation 11.

According to an embodiment of the invention, Q=0, which describes the situation where a previous OFDM symbol does not exist. This may be the case, for instance, for the first OFDM symbol in the sequence of OFDM symbols constituting the OFDM signal g(t).

Further, as can be seen in equation 11, the addition of the transmitter correction vector $w_i$ to the information symbol vector $d_i$, in order to result in the modulation vector $\bar{d}_i$, constitutes an affine projection of the information symbol vector $d_i$. This affine projection first includes a projection of the information symbol vector $d_i$, and then a translation in relation to a modulation vector $\bar{d}_{i-1}$ of a previous OFDM symbol.

Further, when the modulation vector $\bar{d}_i$ to be used for the current OFDM symbol has been determined, this modulation vector $\bar{d}_i$ is, according to the invention, used for modulating the OFDM subcarriers in the used OFDM subcarrier set. In a third step 103 of the method, this modulation is performed in accordance with the association being defined above for the information symbol vector $d_i$. Thus, each of the elements of the modulation vector $\bar{d}_i$ for a current symbol is associated with a certain OFDM subcarrier. Specifically, the kth element of the modulation vector $\bar{d}_i$ for the current symbol is associated with a kth OFDM subcarrier, k being an integer, whereby all elements of the modulation vector $\bar{d}_i$ are associated with a separate OFDM subcarrier.

Then, the set of OFDM subcarriers are modulated by the use of these associated vector elements. The set of OFDM subcarriers are, after being modulated, transmitted, over a transmission channel, which can be a wireless transmission channel or a transmission channel of a wireline connection.

Figure 2:
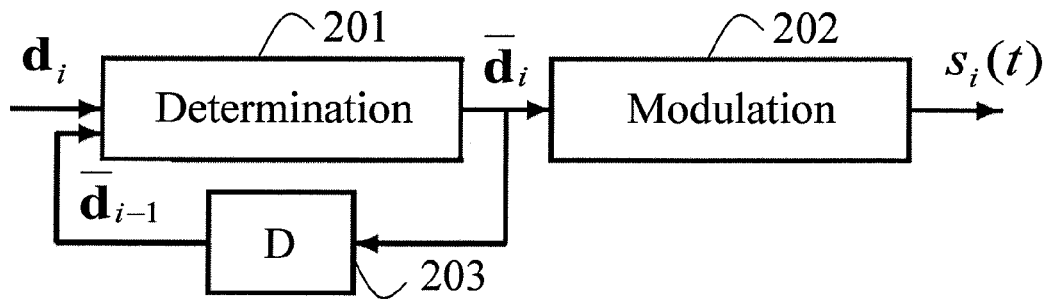
FIG. 2 shows a block diagram of an example transmitter operating in accordance with the invention.

FIG. 2 shows a block diagram for an example transmitter operating in accordance with the invention. The transmitter includes a determination entity 201, which is arranged for performing the determination of the modulation vector $\bar{d}_i$ to be used for modulating the OFDM subcarriers used. Thus, this determination entity 201 performs the affine projection of the information symbol vector $d_i$, by determining transmitter correction vector $w_i$ and performing the addition of the information symbol vector $d_i$ and the transmitter correction vector $w_i$. The determination entity 201 is here provided with the information symbol vector $d_i$ for the current OFDM symbol, $s_i(t)$, and with the modulation vector $\bar{d}_{i-1}$ for the previous OFDM symbol, whereby the modulation vector $\bar{d}_{i-1}$ of the previous OFDM symbol is provided by a delay feedback loop 203 from the output of the determination entity.

The output of the determination entity 201 is connected to an input of a modulation entity 202 and is arranged to provide the determined modulation vector $\bar{d}_i$ for the current OFDM symbol, $s_i(t)$, to the modulation entity 202. The modulation entity 202 is arranged to perform modulation of the OFDM subcarriers in the set of OFDM subcarriers used. This modulation is performed by the use of the elements in the determined modulation vector $\bar{d}_i$ in accordance with the association being defined for the information symbol vector $d_i$. The output of the determination entity 201 is also connected to the input of the determination entity by the delay feedback loop 203, and is arranged for providing the modulation vector $\bar{d}_{i-1}$ for the previous OFDM symbol to the input of the determination entity 203.

When analyzing the transmission method of the invention, a number of advantages appear. There is, according to the invention, no need for modification of the cyclic prefix length, i.e. no need for extension of the cyclic prefix length or for reduction of the effective length of the cyclic prefix. In prior art time-windowing solutions, this length has to be modified, which may have a negative effect on the spectral efficiency or the channel dispersion sensitivity.

Also, no additional transmit power is required, since it can be shown that $E\{\|\bar{d}_i\|^2\} = E\{\|d_i\|^2\}$, where $\|\bullet\|$ is a Euclidean norm. This is, of course, a very attractive characteristic, since it is always advantageous to keep the transmitted power to a minimum.

Further, the invention causes a very small performance loss in terms of error rates. This performance loss is much smaller for the invention than the performance losses reported for prior art solutions introducing correlation between transmitted data symbols.

Also, the method is simple to apply, since it does not include any choice of target frequencies that should be suppressed, as was needed in many prior art methods.

The invention offers a performance improvement, being measured in, for instance, adjacent channel leakage ratio, ACLR, by an order of a magnitude, when being compared to prior art solutions.

As an illustrative example of characteristics and advantages of the invention, the embodiment of the invention being defined by determining the modulation vector $\bar{d}_i$ in accordance with equation 11 will be analyzed hereafter.

In equation 11, the K×K matrices P and Φ are fixed and only depend on the (fixed) subcarrier indexes $I_D = \{k_0, k_1, k_2, \ldots, k_{K-1}\}$ and the (fixed) fraction of the cyclic prefix length to the OFDM symbols length, $T_g/T_s$. Thus, parts of equation 11, including the matrices P and Φ, can be calculated in advance and be reused, which has computational advantages.

Further, as was partly stated above, it can be shown that $E\{\|\bar{d}_i\|^2\} = \{\|d_i\|^2\}K$. This means that the average power of the modulation vector $\bar{d}_i$ determined by the invention is the same as that of the information symbol vector $d_i$. Thus, no transmission power loss results from the invented method.

Also, it can be shown that $E\{\|w_i\|^2\} = 2N$, where $\|\bullet\|$ is a Euclidean norm. Thus, the average power of the added transmitter correction vector $w_i$ is the same as twice the number of equations in the set of constraints being defined in equation 4. This number of equations is usually much smaller than the number of subcarriers. In other words, usually $E\{\|w_i\|^2\} = 2N \ll K = E\{\|d_i\|^2\}$, and the modulation vector $\bar{d}_i$ is very close to the information symbol vector $d_i$ in a Euclidean sense. The transmission power relating to the transmitter correction vector $w_i$ may be tens of decibels below the transmission power relating to the information symbol vector $d_i$. This property is also used in the design of a receiver receiving a signal being transmitted by a transmitter working in accordance with the invention. In particular, such a receiver could choose to treat the transmitter correction vector $w_i$ as additive noise.

Figure 3:
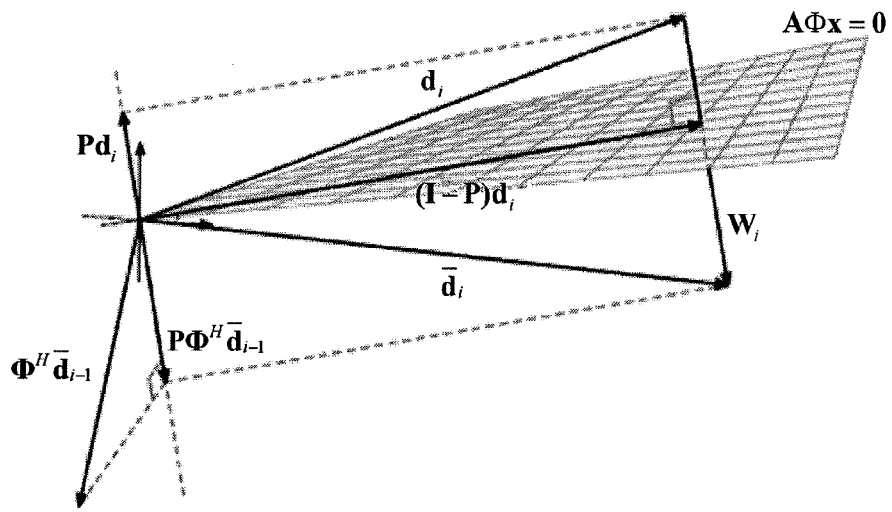
FIG. 3 shows an illustration of the geometry of example determination of the modulation vector $\bar{d}_i$.

In FIG. 3, the geometry of the determination of the modulation vector $\bar{d}_i$ is illustrated. As can be seen in both equation 11 and in FIG. 3, the information symbol vector $d_i$ is multiplied with the fixed matrix (I−P) and is then shifted by the vector $P\Phi^H \bar{d}_{i-1}$. Such an operation, i.e. a multiplication followed by a shift, is an affine operation. Furthermore, since the matrix (I−P) is idempotent ($X^2 = X$) and Hermitian ($X^H = X$), the operation represents a projection. The determination of the modulation vector $\bar{d}_i$, i.e. the addition of the transmitter correction vector $w_i$ to information symbol vector $d_i$, thus represents an affine projection. Also, FIG. 2 shows that the two components of the right hand side of equation 11, i.e. components (I−P)$d_i$ and $P\Phi^H \bar{d}_{i-1}$, are orthogonal to each other.

Further, according to an embodiment of the invention, at least one element in the current information symbol vector $d_i$ is equal to zero.

Hereafter, a preferred method of a receiver receiving an OFDM signal being transmitted in accordance with a transmitter of the invention will be described. The example receiver is an iterative receiver, being arranged to receive and detect the OFDM signal in iterative stages j.

Figure 4:
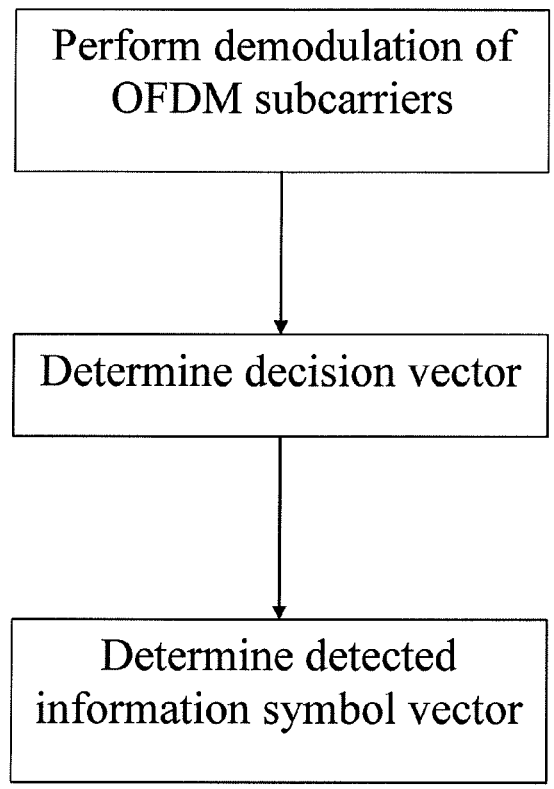
FIG. 4 shows a flowchart of a detection method according to a preferred embodiment of the invention.

FIG. 4 shows a flowchart for the detection method according to a preferred embodiment of the invention. First, a set of OFDM subcarriers are received and demodulated such that a modulation vector $r_i$ is retrieved. Second, a decision vector $\bar{r}_i^{(j)}$ is determined for iteration stage j preferably by adding a receiver correction vector $v_i^{(j)}$ to said received modulation vector $r_i$, thus $\bar{r}_i^{(j)} = r_i + v_i^{(j)}$.

A detected information symbol vector $\hat{d}_i^{(j)}$, containing data for an OFDM symbol being modulated and transmitted from a transmitter according to the invention, is determined from the decision vector $\bar{r}_i^{(j)}$.

According to an embodiment of the invention, the receiver correction vector $v_i^{(j)}$ is a function of the received modulation vector $r$, and of a detected information symbol vector $\hat{d}_i^{(j-1)}$, where the detected information symbol vector $\hat{d}_i^{(j-1)}$ is output from a previous iteration stage j−1.

According to an embodiment of the invention, the receiver correction vector $v_i^{(j)}$ is equal to:

$$v_i^{(j)} = -Pr_i + Q\hat{d}_i^{(j-1)}. \quad \text{(eq. 14)}$$

Then, the decision vector $\bar{r}_i^{(j)}$ is equal to:

$$\bar{r}_i^{(j)} = (I-P)r_i + Q\hat{d}_i^{(j-1)}, \quad \text{(eq. 15)}$$

Here, matrices P and Q are functions of A and Φ, as defined above for the transmitter side.

In correspondence with the method for transmission of the invention, the addition of the receiver correction vector $v_i^{(j)}$ to the received modulation vector $r_i$ constitutes an affine projection of the received modulation vector $r_i$. That is, the addition includes a projection of the received modulation vector $r_i$, followed by a translation in relation to the detected information symbol vector $\hat{d}_i^{(j-1)}$ of the previous iteration stage j−1.

Further, according to an embodiment of the invention, $P = \Phi^H A^H (AA^H)^{-1} A\Phi$ and $Q = P$. This embodiment will hereafter be used for illustrating the method of an iterative receiver working in accordance with the invention. The described steps of the reception can of course be generalized to the more general receiver working in accordance with equation 14 and 15.

The received modulation vector $r_i$ is here:

$$r_i = \bar{d}_i + n_i \quad \text{(eq. 16)}$$
$$= d_i - Pd_i + P\Phi^H \bar{d}_{i-1} + n_i,$$

where $n_i$ denotes the channel noise. The receiver, according to the embodiment, determines in iteration stage j the decision vector $\bar{r}_i^{(j)}$ as:

$$\bar{r}_i^{(j)} = (I-P)r_i + P\hat{d}_i^{(j-1)}. \quad \text{(eq. 17)}$$

When equations 16 and 17 are combined, the following expression for the modulation vector $\bar{r}_i$ is achieved:

$$\begin{aligned}\bar{r}_i^{(j)} &= (I-P)r_i + P\hat{d}_i^{(j-1)} \quad \text{(eq. 18)}\\ &= (I-P)d_i + P\hat{d}_i^{(j-1)} + (I-P)n_i\\ &= d_i - P\left(d_i - \hat{d}_i^{(j-1)}\right) + (I-P)n_i\\ &\approx d_i + \tilde{n}_i,\end{aligned}$$

since it is likely that $d_i - \hat{d}_i^{(j-1)}$ is small. In this expression, $\tilde{n} = (I-P)n_i$.

Thus, when determining the decision vector $\bar{r}_i^{(j)}$ by adding it to a receiver correction vector $v_i^{(j)}$, in accordance with the invention, a detected information symbol vector $\hat{d}_i^{(j)}$ can easily be determined from the decision vector $\bar{r}_i^{(j)}$.

The method for detection according to the invention has an advantage in that it operates on a per-subcarrier basis, which means that a decision is made for each separate subcarrier. This makes the detection method well adapted for receiving the OFDM signal having been precoded and transmitted by the transmission method according to the invention.

Also, according to an embodiment of the invention, where a previous OFDM symbol does not exist, Q=0.

According to an embodiment of the invention, the receiver correction vector $v_i^{(j)}$ is determined as being based on an estimation of the transmitter correction vector $w_i$, which is the correction vector having been used in the transmitter for determining the modulation vector $\bar{d}_i$.

According to an embodiment of the invention, a number of iteration stages being used in the receiver is equal to one. This means that the detection method is performed in only one iteration stage. This embodiment can be useful when a large number of OFDM subcarriers is used, since then a high quality decision for the detection can be made already after the first iteration stage. A balance can here be found between the complexity of the detection, i.e. the number of the iteration stages used, and the performance of the detection.

According to an embodiment of the invention, channel equalization is also performed in a step of performing demodulation of the OFDM subcarriers. To perform channel equalization in the receiver has the advantage that channel fading can be corrected for, which results in lower total error rates for the transmission.

Figure 5:
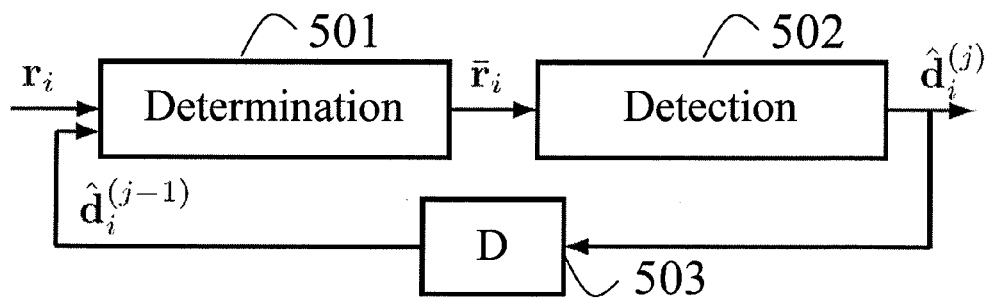
FIG. 5 shows a block diagram of an example receiver operating in accordance with the invention.

FIG. 5 shows a block diagram for an example receiver operating in accordance with the invention. The receiver includes a determination entity 501, which is provided with a received modulation vector $r_i$ from a demodulation entity (not shown) and for which an output is connected to an input of the detection entity 502. The demodulation entity is arranged to provide the received modulation vector $r_i$ to the determination entity 501. The determination entity 501 is arranged to determine the decision vector $\bar{r}_i^{(j)}$ by adding a receiver correction vector $v_i^{(j)}$ to the received modulation vector $r_i$. The decision vector $\bar{r}_i^{(j)}$ is then provided to an input of the detection entity 502.

An output of the detection entity 502 is connected to an input of the determination entity 501 through a feedback loop 503, which is arranged to delay an output of the detection entity one iteration stage. Thus, a detected information symbol vector $\hat{d}_i^{(j-1)}$ resulting from a previous iteration stage j−1 is provided to the determination entity 501 in the current iteration stage j.

As an output of the detection entity 502, the detected information symbol vector $\hat{d}_i^{(j)}$ is output.

Further, the different steps of the methods for transmission and detection, in accordance with the invention described above can be combined or performed in any suitable order. A condition for this of course, is that the requirements of a step, to be used in conjunction with another step of the method of the invention, for example in terms of available information symbol vectors $d_i$, modulation vectors $\bar{d}_i$, transmitter correction vector $w_i$, received modulation vectors $r_i$, decision vectors $\bar{r}_i^{(j)}$, receiver correction vectors $v_i^{(j)}$, and detected information symbol vector $\hat{d}_i^{(j)}$ must be fulfilled.

Also, the transmitter and the receiver of the invention can be adapted to perform any of the steps of the transmission and detection methods of the invention, respectively. Thus, the transmitter of the invention can be adapted to include means for performing any of the steps of the transmission method, whereas a receiver of the invention can be adapted to include means for performing any of the steps of the detection method of the invention. A trivial requirement is of course that such a step involves the transmitter and the receiver, respectively.

Figure 6:
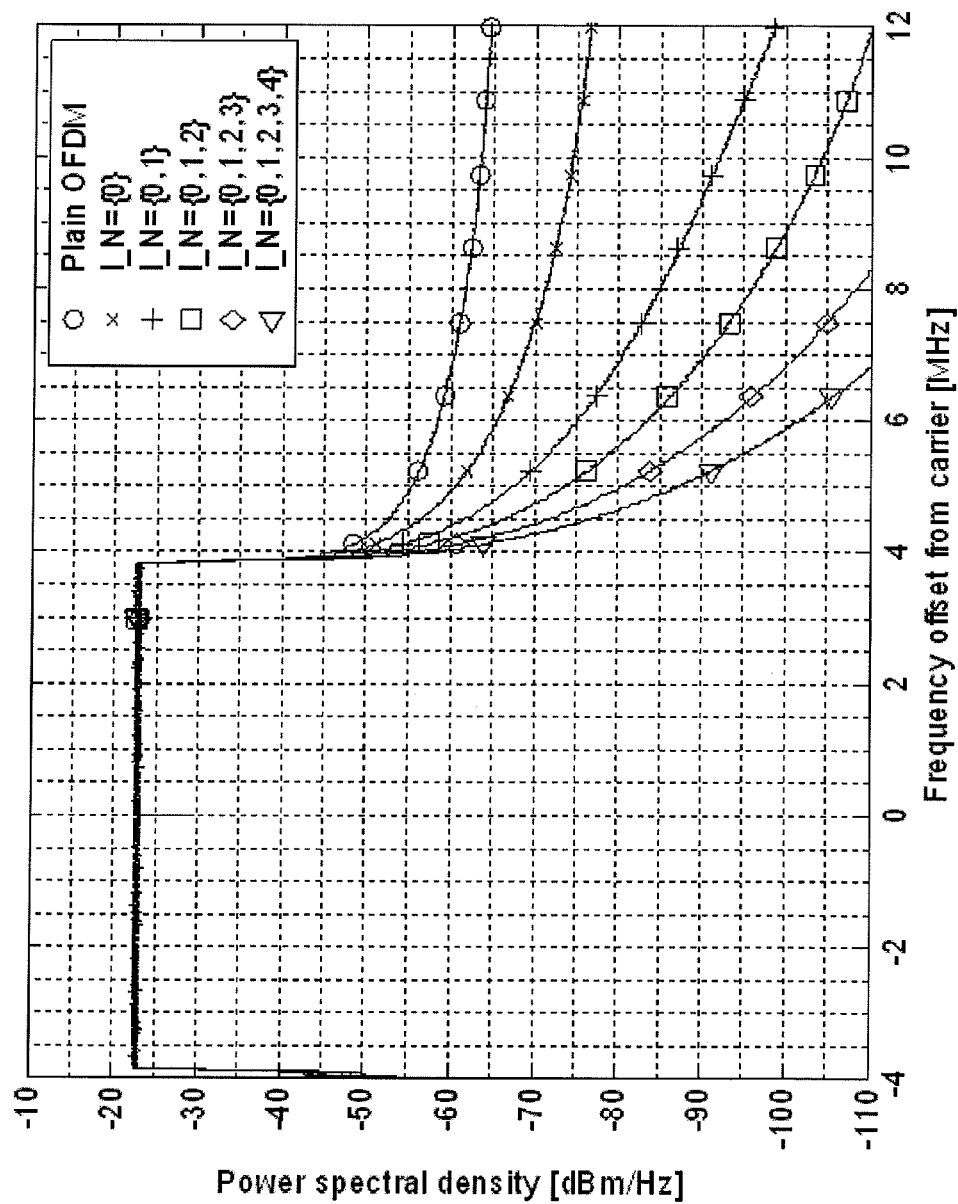
FIGS. 6 and 7 show simulation results for some example realizations in accordance with the invention.

FIG. 6 shows an illustration of simulation results of a transmitter power spectrum for example embodiments in accordance with the invention for various choices of the number of criteria N used in the index set $I_N$ of equation 4, i.e. for different choices of the index set $I_N$. An OFDM transmitter with 512 subcarriers and a subcarrier spacing of 15 kHz has been used for the simulation. The useful part of the OFDM symbol is 1/15 ms and the cyclic prefix is of duration 3/640 ms. These parameters are in line with the latest specifications of the 3GPP E-UTRA downlink.

Figure 7:
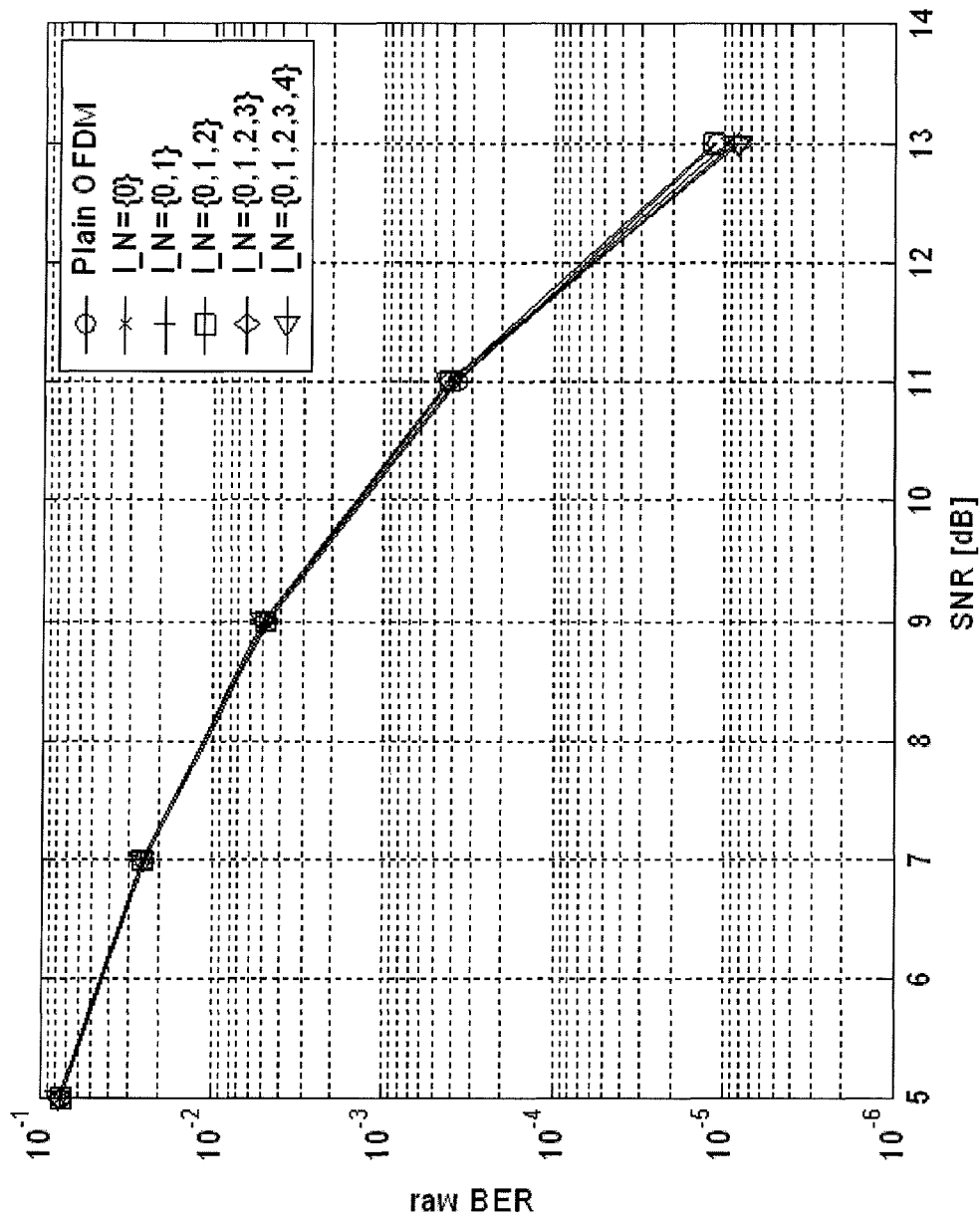

FIG. 7 shows results of a simulation of the performance of the example receiver of FIG. 5, with 8 iterations stages.

The simulations shown in FIGS. 6 and 7 clearly illustrate that the signal power being emitted outside a designated transmission bandwidth, in a transmitter of the invention, is much lower than for plain OFDM. They also show that this improvement in out-of-band emission results in no or very little degradation on the error rates of the received signal.

Further, those skilled in the art should understand that the foregoing embodiments or part of the processing may be implemented by processing circuitry through computer programs controlling related hardware. The computer program can be stored on a computer readable storage media. Example computer programs include embodied methods for transmission and detection as described above.

An example computer program product according to the invention includes a computer readable medium storing an abovementioned computer program. Non-exclusive examples of storage media for this purpose are read only memory, ROM, optical discs, electromagnetic discs and electronic memory, such as random access memory, RAM, or flash memory.

The invention may be applied in essentially any wireline or wireless system carrying data by a set of subcarriers.

While the invention has been described in connection with specific embodiments thereof, it will be understood that it is capable of further modifications. This application is intended to cover any variations, uses, adaptations or implementations of the invention, not excluding software enabled units and devices, within the scope of subsequent claims following, in general, the principles of the invention as would be obvious to a person skilled in the art to which the invention pertains.

We claim:

1. A method of transmitting a signal, said signal being composed of symbols and being transmitted by the use of a set of frequency subcarriers, said method comprising for at least one current symbol:

defining an association of each element of a current information symbol vector, $d_i$, with a subcarrier of said set of frequency subcarriers, determining a current modulation vector, $\bar{d}_i$, corresponding to addition of a transmitter correction vector, $w_i$, to said current information symbol vector, $d_i$, providing a transition between a previous symbol and said current symbol of continuity of a specified order, n, in time domain, and modulating said set of frequency subcarriers with elements of said current modulation vector, $\bar{d}_i$, in accordance with said association;

wherein the transmitter correction vector $w_i$ is equal to:

$$w_i = -Pd_i + Q\bar{d}_{i-1},$$

or the current modulation vector $\bar{d}_i$ is equal to:

$$\bar{d}_i = (I-P)d_i + Q\bar{d}_{i-1},$$

where

P and Q are functions of A and $\Phi$,

A is a matrix having elements of a form corresponding to $k^m$, $\Phi$ is a diagonal matrix having elements of a form corresponding to $e^{j\alpha k}$, $\bar{d}_{i-1}$ is a previous modulation vector, k is an OFDM subcarrier index, m is an integer, and $\alpha$ is an arbitrary value.

2. The method as claimed in claim 1, wherein said addition of the transmitter correction vector $w_i$ to said current information symbol vector $d_i$ constitutes an affine projection of said current information symbol vector $d_i$;

said signal is an Orthogonal Frequency Division Multiplex (OFDM) signal;

said symbols are OFDM symbols; and said set of frequency subcarriers is a set of OFDM subcarriers.

3. The method as claimed in claim 2, wherein said affine projection includes a projection of said current information symbol vector $d_i$, followed by a translation in relation to the previous modulation vector $\bar{d}_{i-1}$.

4. The method as claimed in claim 2, wherein the correction vector, $w_i$, provides the current modulation vector, $\bar{d}_i$, at a minimum distance from the information symbol vector $d_i$ according to a specified distance measure while providing the continuity of the specified order, n, in time domain.

5. The method as claimed in claim 4, wherein the distance measure comprises Euclidean distance.

6. The method as claimed in claim 2, wherein said continuity is based on a set of equations:

$$\left.\frac{d^n}{dt^n}s_i(t)\right|_{t=-T_g} = \left.\frac{d^n}{dt^n}s_{i-1}(t)\right|_{t=T_s}, \quad n \in I_N,$$

where $I_N$ is an index set of non-negative integers, $s_i(t)$ is an ith OFDM symbol in said OFDM signal, being defined for a time period between a first time instant $-T_g$ and a second time instant $T_s$.

7. The method as claimed in claim 2, wherein the transmitter correction vector $w_i$ is a function of said current information symbol vector $d_i$ and of the previous modulation vector $\bar{d}_{i-1}$.

8. The method as claimed in claim 2, wherein said addition of the transmitter correction vector $w_i$ to said current information symbol vector $d_i$ constitutes an affine projection of said current information symbol vector $d_i$.

9. The method as claimed in claim 1, wherein $$P = \Phi^H A^H (AA^H)^{-1} A\Phi,$$

where $(\bullet)^H$ is a Hermitian transpose.

10. The method as claimed in claim 9, wherein $Q = P\Phi^H$ unless $Q=0$.

11. The method as claimed in claim 1, wherein said matrix A is $$A = \begin{pmatrix} 1 & 1 & \cdots & 1 \\ k_0 & k_1 & \cdots & k_{K-1} \\ \vdots & \vdots & & \vdots \\ k_0^{N-1} & k_1^{N-1} & \cdots & k_{K-1}^{N-1} \end{pmatrix},$$

where

N is a number of rows in said matrix A,

K is a number of columns in said matrix A, and $k_0, k_1, \ldots, k_{K-1}$ are OFDM subcarrier indices; or wherein said matrix $\Phi$ is $$\Phi = \text{diag}\begin{pmatrix} e^{-j2\pi k_0 \frac{T_g}{T_s}} \\ e^{-j2\pi k_1 \frac{T_g}{T_s}} \\ \vdots \\ e^{-j2\pi k_{K-1} \frac{T_g}{T_s}} \end{pmatrix},$$

where $T_g$ is a guard interval time, $T_g \geq 0$, and $T_s$ is a data symbol time, $T_s > 0$.

12. A method of detecting a signal, said signal being composed of symbols and being transmitted by the use of a set of frequency subcarriers, said method comprising an iterative reception stage j including, performing demodulation of said set of frequency subcarriers, where said set of frequency subcarriers carries the signal of provided continuity of a specified order, n, in time domain for transitions between the symbols, said demodulation resulting in a received modulation vector $r_i$, determining a decision vector $\bar{r}_i^{(j)}$, corresponding to addition of a receiver correction vector $v_i^{(j)}$ to said received modulation vector $r_i$, wherein the receiver correction vector $v_i^{(j)}$ represents at least in part the providing of continuity for symbol transitions, and determining a detected information symbol vector $\hat{d}_i^{(j)}$, containing symbol data, from said decision vector $\bar{r}_i^{(j)}$;

wherein the receiver correction vector $v_i^{(j)}$ is equal to:

$$v_i^{(j)} = -Pr_i + Q\hat{d}_i^{(j-1)},$$

where

P and Q are functions of A and $\Phi$,

A is a matrix having elements of a form corresponding to $k^m$, $\Phi$ is a diagonal matrix having elements of a form corresponding to $e^{j\alpha k}$, k is a OFDM subcarrier index, m is an integer, and $\alpha$ is an arbitrary value.

13. The method as claimed in claim 12, wherein:

said addition of the receiver correction vector $v_i^{(j)}$ to said received modulation vector $r_i$ constitutes an affine projection of said received modulation vector $r_i$;

said signal is an Orthogonal Frequency Division Multiplex (OFDM) signal;

said symbols are OFDM symbols; and said set of frequency subcarriers is a set of OFDM subcarriers.

14. The method as claimed in claim 13, wherein said affine projection includes a projection of said received modulation vector $r_i$, followed by a translation in relation to a detected information symbol vector $\hat{d}_i^{(j-1)}$ resulting from a previous iteration stage.

15. The method as claimed in claim 13, wherein the decision vector $\bar{r}_i^{(j)}$ is equal to:

$$\bar{r}_i^{(j)} = (I-P)r_i + Q\hat{d}_i^{(j-1)}.$$

16. The method as claimed in claim 13, wherein said performing demodulation includes channel equalization.

17. A non-transitory computer readable medium configured to store computer programs—that runs in a computer and causes the computer to perform signal processing on a signal comprising a set of frequency subcarriers, the signal processing comprising:

defining an association of each element of a current information symbol vector, $d_i$, with a subcarrier of said set of frequency subcarriers;

determining a current modulation vector, $\bar{d}_i$, corresponding to addition of a transmitter correction vector, $w_i$, to said current information symbol vector, $d_i$, providing a transition between a previous symbol and said current symbol of continuity of a specified order in time domain, and modulating said set of frequency subcarriers with elements of said current modulation vector, $\bar{d}_i$, in accordance with said association;

wherein the transmitter correction vector $w_i$ is equal to:

$$w_i = -Pd_i + Q\bar{d}_{i-1},$$

or the current modulation vector $\bar{d}_i$ is equal to:

$$\bar{d}_i = (I-P)d_i + Q\bar{d}_{i-1},$$

where

P and Q are functions of A and $\Phi$,

A is a matrix having elements of a form corresponding to $k^m$, $\Phi$ is a diagonal matrix having elements of a form corresponding to $e^{j\alpha k}$, $\bar{d}_{i-1}$ is a previous modulation vector, k is an OFDM subcarrier index, m is an integer, and $\alpha$ is an arbitrary value.

18. A transmitter arranged for transmitting an Orthogonal Frequency Division Multiplex (OFDM) signal having low emitted signal power outside a designated transmission bandwidth, said OFDM signal being composed of OFDM symbols and being transmitted by the use of a set of OFDM subcarriers, said transmitter comprising a processor configured to:

define an association of each element of a current information symbol vector, $d_i$, with an OFDM subcarrier of said set of OFDM subcarriers, determine a current modulation vector, $\bar{d}_i$, by adding a transmitter correction vector, $w_i$, to said current information symbol vector, $d_i$, providing a transition between a previous OFDM symbol and said current OFDM symbol of continuity in time domain of a specified order, n, where n is a natural number, and modulate said set of OFDM subcarriers with elements of said current modulation vector, $\bar{d}_i$, in accordance with said association;

wherein the transmitter correction vector $w_i$ is equal to:

$$w_i = -Pd_i + Q\bar{d}_{i-1},$$

or the current modulation vector $\bar{d}_i$ is equal to:

$$\bar{d}_i = (I-P)d_i + Q\bar{d}_{i-1},$$

where

P and Q are functions of A and $\Phi$,

A is a matrix having elements of a form corresponding to $k^m$, $\Phi$ is a diagonal matrix having elements of a form corresponding to $e^{j\alpha k}$, $\bar{d}_{i-1}$ is a previous modulation vector, k is an OFDM subcarrier index, m is an integer, and $\alpha$ is an arbitrary value.

19. A receiver of an Orthogonal Frequency Division Multiplex (OFDM) signal, said OFDM signal being composed of OFDM symbols and being transmitted by the use of a set of OFDM subcarriers, the receiver being an iterative receiver comprising a processor configured to:

perform a demodulation of said set of OFDM subcarriers, where said set of subcarriers carries an OFDM signal of provided continuity of a specified order, n, where n is a natural number, in time domain for transitions between the OFDM symbols, said demodulation resulting in a received modulation vector $r_i$, determine a decision vector $\bar{r}_i^{(j)}$ by adding a receiver correction vector $v_i^{(j)}$ to said received modulation vector $r_i$, the receiver correction vector $v_i^{(j)}$ corresponding at least in part to the providing of continuity for symbol transitions, and determine a detected information symbol vector $\hat{d}_i^{(j)}$, containing data for an OFDM symbol, from said decision vector $\bar{r}_i^{(j)}$;

wherein the receiver correction vector $v_i^{(j)}$ is equal to:

$$v_i^{(j)} = -Pr_i + Q\hat{d}_i^{(j-1)},$$

where

P and Q are functions of A and $\Phi$,

A is a matrix having elements of a form corresponding to $k^m$, $\Phi$ is a diagonal matrix having elements of a form corresponding to $e^{j\alpha k}$, k is a OFDM subcarrier index, m is an integer, and $\alpha$ is an arbitrary value.

20. The receiver according to claim 19, wherein: said addition of the receiver correction vector $v_i^{(j)}$ to said received modulation vector $r_i$ constitutes an affine projection of said received modulation vector $r_i$; and wherein the decision vector $\bar{r}_i^{(j)}$ is equal to:

$$\bar{r}_i^{(j)} = (I-P)r_i + Q\hat{d}_i^{(j-1)}.$$

* * * * *